(12) United States Patent
Royston

(10) Patent No.: US 8,693,949 B2
(45) Date of Patent: Apr. 8, 2014

(54) NEAR-FIELD RF COMMUNICATORS HAVING A LOW-ENERGY PRE-POLLING PROCESS

(75) Inventor: Philip Stewart Royston, Newbury (GB)

(73) Assignee: Broadcom Corporation, Irvine, CA (US)

( * ) Notice: Subject to any disclaimer, the term of this patent is extended or adjusted under 35 U.S.C. 154(b) by 195 days.

(21) Appl. No.: 13/248,822

(22) Filed: Sep. 29, 2011

(65) Prior Publication Data

US 2012/0077434 A1 Mar. 29, 2012

(30) Foreign Application Priority Data

Sep. 29, 2010 (GB) .................................. 1016367.3

(51) Int. Cl.
*H04B 5/00* (2006.01)
(52) U.S. Cl.
USPC ... 455/41.1; 455/41.2; 455/67.11; 455/67.16; 455/205; 340/854.8; 340/538.16; 343/702; 343/867; 327/564
(58) Field of Classification Search
USPC ................. 455/41.1, 41.2, 67.11, 67.16, 205; 340/854.8, 538.16; 343/702, 867; 327/564
See application file for complete search history.

(56) References Cited

U.S. PATENT DOCUMENTS

| 7,881,665 | B2 * | 2/2011 | Symons | 455/41.1 |
|---|---|---|---|---|
| 7,986,916 | B2 * | 7/2011 | Williams | 455/41.1 |
| 8,140,010 | B2 * | 3/2012 | Symons et al. | 455/41.1 |
| 8,150,321 | B2 * | 4/2012 | Winter et al. | 455/41.2 |
| 8,233,842 | B2 * | 7/2012 | Symons | 455/41.1 |
| 8,249,500 | B2 * | 8/2012 | Wilson | 455/41.1 |
| 8,326,224 | B2 * | 12/2012 | Butler | 455/41.1 |
| 8,422,946 | B2 * | 4/2013 | Bangs et al. | 455/41.1 |
| 8,489,020 | B2 * | 7/2013 | Bangs et al. | 455/41.1 |
| 2006/0244630 | A1 | 11/2006 | Finkenzeller | |
| 2010/0022188 | A1 | 1/2010 | Nakagawa | |

FOREIGN PATENT DOCUMENTS

| EP | 1988487 | 11/2008 |
|---|---|---|
| JP | 2006115202 | 4/2006 |
| WO | WO 2009/058496 | 5/2009 |
| WO | WO 2009/128032 | 10/2009 |
| WO | WO 2010/096789 | 8/2010 |

OTHER PUBLICATIONS

Search report for Application No. GB1016367.3, dated Jan. 27, 2012, two (2) pages.
English language abstract of JP-2006-115202, Intellectual Property Office (Jan. 30, 2012).

* cited by examiner

*Primary Examiner* — Marceau Milord
(74) *Attorney, Agent, or Firm* — Sterne, Kessler, Goldstein & Fox P.L.L.C.

(57) ABSTRACT

A near-field RF communicator which is operable to perform a polling process to initiate communication with another near-field RF communicator in near-field range, wherein the near-field communicator is configured to perform a detection process, having a lower energy requirement than a polling process, to determine whether a near-field RF communicator is present in near-field range, and to perform the polling process in the event that the detection process indicates that a near-field RF communicator is present in near-field range.

22 Claims, 2 Drawing Sheets

NEAR-FIELD RF COMMUNICATORS HAVING A LOW-ENERGY PRE-POLLING PROCESS

BACKGROUND OF THE INVENTION

This invention relates to near-field RF communicators and near-field communications enabled devices and to their methods of operation.

Near-field RF (radio frequency) communication is becoming more and more commonplace as is the use of such technology to transfer data. Near-field RF communicators communicate through the modulation of the magnetic field (H field) generated by a radio frequency antenna. Near-field RF communication thus requires an antenna of one near-field RF communicator to be present within the alternating magnetic field (H field) generated by the antenna of another near-field RF communicator by transmission of an RF signal (for example a 13.56 MHz signal) to enable the magnetic field (H field) of the RF signal to be inductively coupled between the communicators. The RF signal may be modulated to enable communication of control and/or other data. Ranges of up to several centimetres (generally a maximum of 1 meter) are common for near-field RF communicators.

NFC communicators are a type of near-field RF communicator that is capable in an initiator mode of initiating a near-field RF communication (through transmission or generation of an alternating magnetic field) with another near-field RF communicator and is capable in a target mode of responding to initiation of a near-field RF communication by another near-field RF communicator. The term "near-field RF communicator" includes not only NFC communicators but also initiator near-field RF communicators such as RFID transceivers or readers that are capable of initiating a near-field RF communication but not responding to initiation of a near-field RF communication by another near-field RF communicator and target or responding near-field RF communicators such as RFID transponders or tags that are capable of responding to initiation of a near-field RF communication by another near-field RF communicator but not of initiating a near-field RF communication with another near-field RF communicator. Hence NFC communicators can act as both RFID transceivers and RFID transponders and are able to communicate with other NFC communicators, RFID transceivers and RFID transponders.

In addition NFC communicators may be associated with or comprised within or attached to certain peripheral devices, for example SIM cards (e.g. UICC), Secure Elements, memory devices (for example MCU, RAM, ROM and non-volatile memory), display driver or other drivers. During operation the NFC communicator must also be able to communicate with and transfer data to and from such peripheral devices.

There are several standards in existence which set out certain communication protocols and functional requirements for RFID and near-field RF communications. Examples are ISO/IEC 14443, ISO 15693, ISO/IEC 18092 and ISO/IEC 21481.

NFC and Near-field RF communicators may be comprised within a larger device, such as a mobile telephone, PDA or computer which may comprise a high frequency (e.g. VHF, "FM" or UHF) receiver and transmitter for long range communications for example using GSM or Wi-Fi frequencies. When a near-field RF communicator is comprised within such host devices it is advantageous to reduce emissions from the NFC communicator in frequency bands employed by the host device.

A near-field RF communicator operating in an initiator mode, such as an NFC communicator or other initiator near-field RF communicators, for example an RFID transceiver or reader that is capable of initiating a near-field RF communication, employs a polling sequence to detect whether another near-field RF communicator is present in near-field range and, if so, the communications protocol used by the other near-field RF communicator.

In a typical polling sequence the near-field RF communicator operating in an initiator mode switches on, and generates a carrier signal. After waiting sufficient time for the carrier signal to settle down, the communicator transmits a series of hand shake or "wake-up" signals. Each wake-up signal is configured to initiate communication with a different type of near-field RF communicator, such as different types of RFID tags. A typical polling sequence includes, for example, a wake-up signal for a type-1 tag, a wake-up signal for a type-2 tag and then a wake-up signal for a type-3 tag. Such polling sequences are described in RFID and near-field RF communications standards.

Where a polling sequence includes a separate "wake-up" signal for each of several types of near-field RF communicator, the total duration of each cycle of the polling sequence can be significant. For example a polling sequence according to an accepted near-field communications standard may exceed 10 ms and may be as much as 50 ms or 100 ms. Where the power source of a near-field RF communicator operating in initiator mode is derived from a battery powered host device, the energy required repeatedly to perform a polling sequence may significantly reduce the battery life of that host device.

To preserve battery life it has been proposed to reduce the frequency with which a polling sequence is performed. However, this reduces the perceived responsiveness of the near-field communicators because there may be a delay before communication is initiated after two near-field RF communicators are brought into reading range of each other. In other words, a user's perception of the responsiveness of devices comprising near-field RF communicators is dependent on the time taken to initiate communication. Thus, in order for a near-field RF communicator to respond quickly to the presence of a passive near-field RF communicator (or a near-field RF communicator operating in target mode) coming in to near-field range it has been proposed to perform the polling sequence at frequent intervals. This requires greater energy and may not be desirable in battery operated devices.

Thus there exists a need in the art for a near-field RF communicator which responds quickly to a passive (or target mode) near-field RF communicator coming into near-field range whilst also providing improved power management characteristics.

BRIEF DESCRIPTION OF THE DRAWINGS/FIGURES

Examples of the invention will now be described in greater detail with reference to the accompanying drawings, in which.

DETAILED DESCRIPTION OF THE INVENTION

Figure 1:
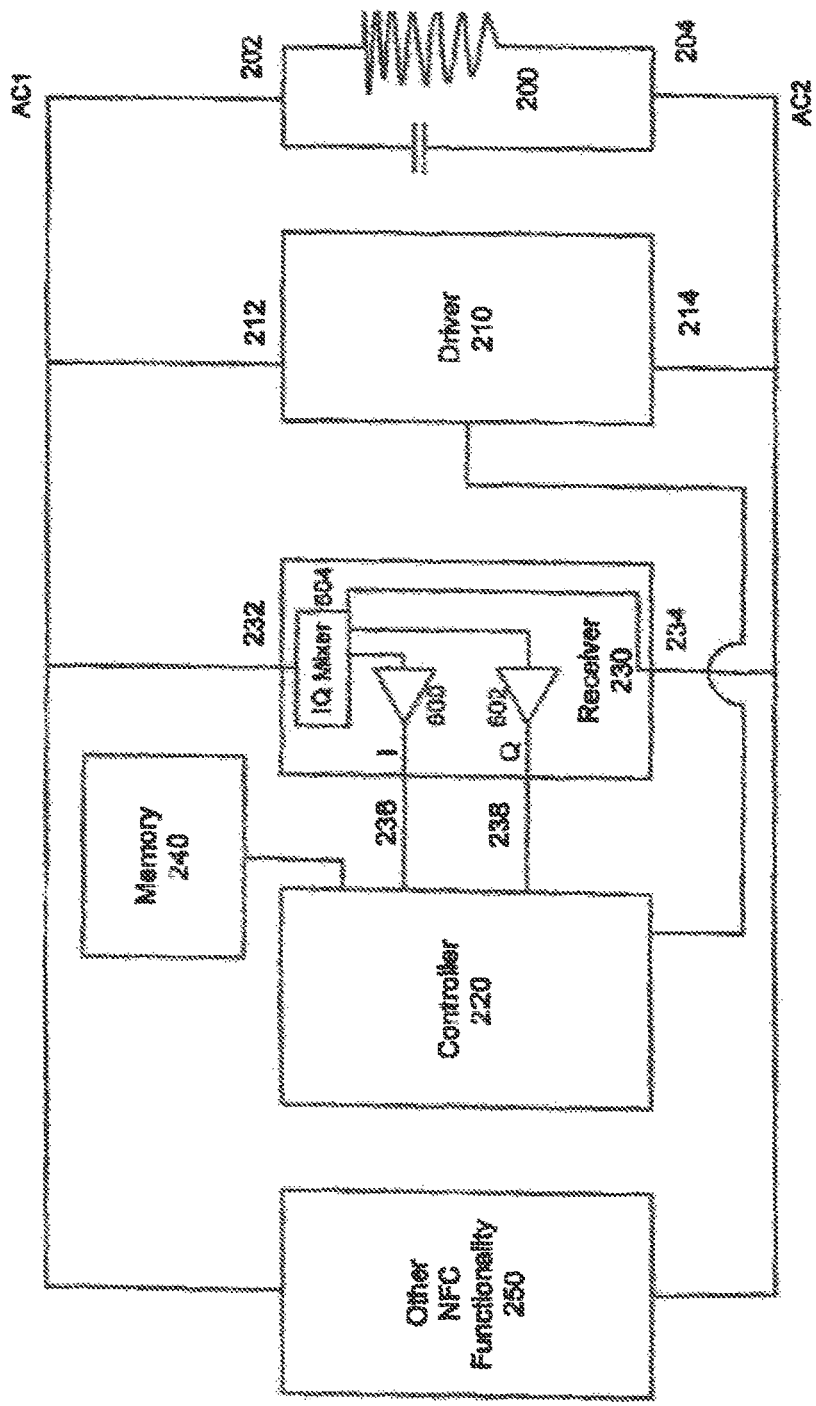
FIG. 1 shows a very schematic view of a near-field RF communicator.

The following Detailed Description refers to accompanying drawings to illustrate exemplary embodiments consistent with the invention. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the subjoined claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is provided in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NEC capable communication devices may be applicable to other communications devices that use the near field and/or the far field without departing from the spirit and scope of the present invention.

Aspects and examples of the invention are set out in the claims and address at least a part of the above described technical problem.

In broad terms, as set out above a near-field communicator operates on a polling cycle. That is to say, at intervals, the powered is turned on, the carrier signal is switched on and a series of "wake-up" signals, each adapted to initiate communication with particular type of tag (or target mode near-field RF communicator) is played out. The near-field RF communicator then stays powered up for a predetermined interval to wait for a response signal and, in the event that no response signal is received, the near-field RF communicator is placed into a sleep state until the next polling period at which time the polling cycle is repeated.

An example of the invention provides a near-field RF communicator which is operable to perform a polling process to initiate communication with another near-field RF communicator in near-field range, wherein the near-field communicator is configured to perform a detection process, having a lower energy requirement than the polling process, to determine whether a near-field RF communicator is present in near-field range, and to perform the polling process in the event that the detection process indicates that a near-field RF communicator is present in near-field range.

This has the advantage of providing improved responsiveness in a near-field RF communicator without requiring more frequent execution of a polling sequence. The polling sequence can be performed only when the comparison indicates that it may be necessary. Preferably the detection process has a lower energy requirement than the polling sequence/procedure and preferably comprises transmitting a carrier signal at substantially the same amplitude as the carrier signal used for the polling process but for a shorter duration than the polling process. In examples of the invention the shorter duration is comparable to the minimum duration required for the carrier signal to achieve steady state and is preferably less than 300 micro seconds, still more preferably less than 200 microseconds, still more preferably less than 100 microseconds. This has the advantage that the detection process has a substantially similar interaction range as the polling process.

In an aspect there is provided a method of operating a near-field RF communicator, the near-field RF communicator comprising an inductive coupler for inductive coupling with an RF H-field, the near-field RF communicator being operable to initiate communication with another near-field RF communicator in near-field range and to detect in-phase and quadrature-phase components of a voltage in the inductive coupler, the method comprising: transmitting an RF signal and comparing an indication of the in-phase and quadrature-phase components of a signal in the inductive coupler with a stored value; and determining whether to initiate polling for another near-field RF communicator based on the comparison. In some possibilities the method comprises storing a value based on the indication of the in-phase and quadrature-phase components in a memory to provide a stored value for subsequent comparison. This and other examples of the invention have the advantage or providing a robust means of detecting the presence of another near-field RF communicator in near-field range because they inherently adapt to changes in the magnetic environment in which a near-field RF communicator is placed and because the use of in phase and quadrature phase signals provides a reliable signal comparison. There is the farther advantage that, if a microprocessor of a host device has read access to the registers of an ADC (analog to digital converter) of a near-field RF communicator the method can be implemented by adapting the microprocessor, for example using software, without the need to provide specially adapted hardware.

Preferably the transmitted signal has a substantially similar amplitude to the amplitude of the carrier signal employed for polling but the transmitted signal is transmitted for a shorter duration than the carrier signal used for polling. In examples of the invention the shorter duration is comparable to the minimum duration required for the carrier signal to achieve steady state and is preferably less than 300 micro seconds, still more preferably less than 200 microseconds, still more preferably less than 100 microseconds. This has the advantage that the detection process has a substantially similar interaction range as the polling process but with a significantly lower energy requirement.

In some embodiments the indication of the in-phase and quadrature-phase components comprises an indication of the in-phase component and an indication of the quadrature-phase component. In some possibilities the stored value comprises a stored value indicating an in-phase signal component and a stored value indicating a quadrature-phase component. In some possibilities the method comprises determining a first difference between the indication of the in-phase signal component and the stored value indicating an in-phase signal component and determining a second difference between the indication of the quadrature-phase signal component and the stored value indicating a quadrature-phase signal component. These and other examples of the invention have the advantage of providing more reliable detection of the presence of a near-field RF communicator.

In some embodiments the method comprises comparing the first difference with a first threshold value and comparing the second difference with a second threshold value and, initiating polling for another near-field RF communicator in the event that either: the first difference exceeds the first threshold value; or the second difference exceeds the second threshold value.

In some embodiments the first threshold value and the second threshold value are equal to each other. In other possibilities the first threshold value and the second threshold value are different from each other.

In some embodiments the method comprises determining a magnitude indication, wherein determining a magnitude indication comprises: determining the square of the first difference and determining the square of the second difference.

In some embodiments the method comprises comparing the magnitude indication with a threshold value. In some possibilities the method comprises determining a phase value based on the indication of the in-phase and quadrature phase components of a signal in the inductive coupler and comparing the phase value with one of: a stored phase value; and a phase value based on a stored value indicating an in-phase signal component and a stored value indicating a quadrature-phase component.

In some embodiments the method comprises polling for another near-field RF communicator at intervals. In some possibilities the method comprises polling for another near-field RF communicator at intervals comprises one of: polling periodically and polling intermittently.

In some embodiments polling for another near-field RF communicator comprises transmitting a wake-up command for at least one type of near-field RF communicator.

In an aspect there is provided a hear-field RF communicator comprising: an inductive coupler for inductive coupling with an RF H-field, and a signal provider coupled to the inductive coupler to transmit a signal; a signal characteristic determiner coupled to the inductive coupler to determine a characteristic of the transmitted signal, wherein said characteristic is indicative of the apparent complex impedance of the inductive coupler; and a controller configured to perform a comparison between the determined characteristic and a stored value and to initiate a polling procedure based on said comparison. This has the advantage of providing a near-field RF communicator which is more responsive without requiring increased power consumption. More frequent execution of a polling sequence is not necessary because the polling sequence can be performed only when the comparison indicates that it may be necessary.

In some embodiments the signal characteristic determiner comprises a phase sensitive detector. In some possibilities the signal characteristic determiner is operable to determine a first phase component of the transmitted signal and a second phase component of the transmitted signal, wherein the first phase component and the second phase component are not in phase. Preferably the first phase component and the second phase component are in quadrature phase.

In some embodiments the characteristic comprises the magnitude of the first phase component and the magnitude of the second phase component. En some possibilities the stored value comprises a stored magnitude of the first phase component and a stored magnitude of the second phase component.

In some embodiments the controller is operable to determine a first difference between the magnitude of the first phase component and the stored magnitude of the first phase component and a second difference between the magnitude of the second phase component and the stored magnitude of the second phase component.

In some embodiments the controller is further operable to compare the first difference with a first threshold value and to compare the second difference with a threshold value.

In some embodiments the controller is operable to determine a magnitude indication based on determining the square of the first difference and determining the square of the second difference.

In some embodiments the controller is operable to compare the magnitude indication with a threshold magnitude value.

In some embodiments the characteristic comprises the phase of the signal and the stored value comprises a stored phase value, wherein the controller is operable to perform said comparison based on determining the difference between the phase of the signal and the stored phase value.

Examples of the invention provide computer readable storage media and signals comprising program instructions to program a processor to perform methods according to the invention and/or to configure a controller of a near-field RF communicator to provide apparatus according to the invention. Such examples of the invention include software and/or firmware.

In the example of FIG. 1 a near-field RF communicator comprises an antenna 200 having first and second antenna connections 202, 204 coupled to driver circuitry 210 and to receiver circuitry 230. Driver circuitry 210 comprises first and second connections 212, 214 each of which are coupled to respective ones of the first and second antenna connections 202, 204. Receiver circuitry 230 comprises first and second input connections 232, 234 each of which are coupled to respective ones of the first and second antenna connections 202, 204. Receiver circuitry has first and second outputs 236, 238 which are coupled to controller 220.

Controller 220 is coupled to a memory 240 and to the driver circuitry 210. Other NFC functionality 250 such as circuitry for performing rectifier and regulator function and other functions is coupled to antenna connections 202, 204. In the interests of clarity this other NFC functionality is not shown in detail in FIG. 1.

Driver 210 comprises a signal provider to provide a radio frequency (e.g. 13.56 MHz) voltage signal to drive antenna 200 to provide a radio frequency H-field. Antenna 200 is operable to couple with reactive impedances in near-field range, for example by inductive coupling.

In the example of FIG. 1 receiver 230 comprises an IQ-mixer 604 adapted to receive an analog RF signal AC1, AC2 from receiver inputs 232, 234 and to provide digital signals I and Q to respective analog to digital converters (ADCs) 600, 602. The analog to digital converters 600, 602 provide digital signal outputs at respective receiver outputs 236 and 238 representing the in-phase, I, and quadrature-phase, Q, components of the received signal AC1, AC2. In alternative examples receiver 220 is configured so that the ADC stage is performed before the IQ-mixing stage and the mixing is performed in the digital domain.

Controller 220 is operable to receive the in-phase and quadrature phase signals IQ and to store in memory 240 a value representing the amplitude of the in-phase signal, I, and a value representing the quadrature phase signal, Q, component of the received signal AC1, AC2. Controller 220 is further operable to retrieve a stored I and/or Q value from memory 240 and to compare the stored value with a value received from receiver 230.

As will be appreciated by the skilled practitioner in the context of the present disclosure, the loading and/or tuning of antenna 200 may be modified by objects, such as other antennae in near-field range. The inventors in the present case have appreciated that such antenna loading has the effect of modifying the complex impedance of the antenna and that these changes can be detected based on changes in antenna loading between subsequent applications of a test signal.

Figure 2:
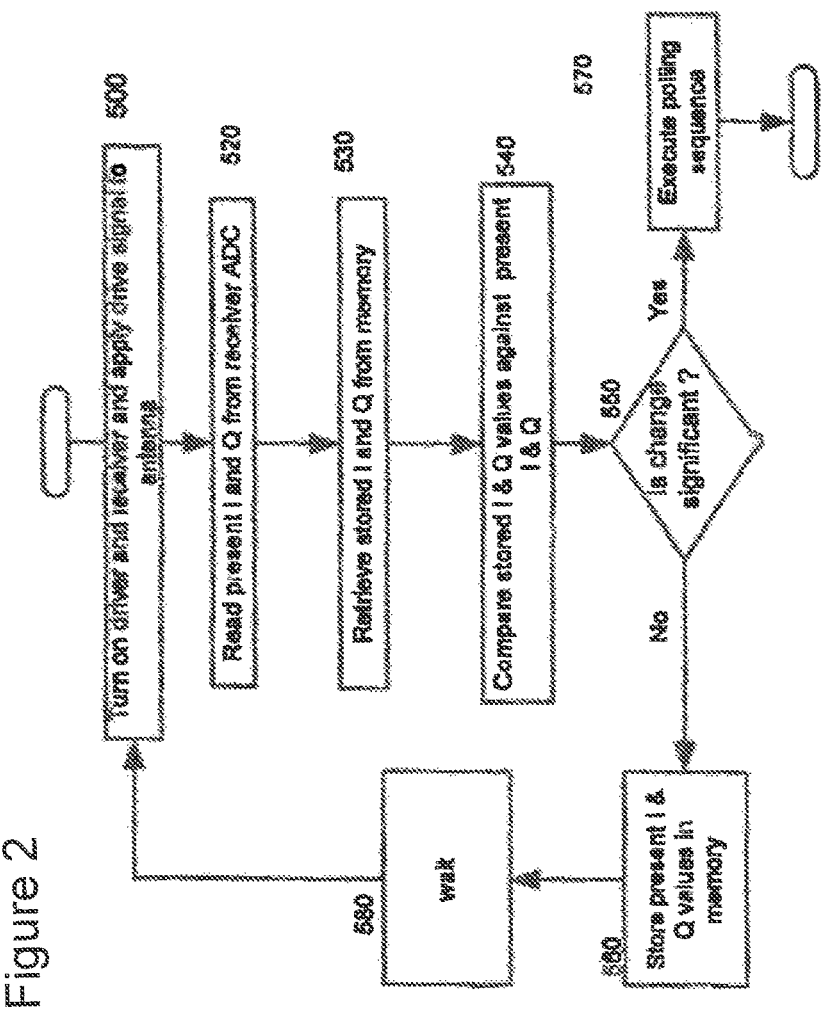
FIG. 2 shows a flow chart indicating a method of operating a near-field RF communicator in an initiator mode.

The operation of a near-field RF communicator such as that illustrated in FIG. 1 will now be described in greater detail with reference to the flow chart shown in FIG. 2.

The initial step 500 is that controller 240 controls driver 210 to provide a signal to antenna 200 and maintains the signal until it has settled to apply a drive signal to the antenna. The drive signal is then switched off. At step 520 the receiver provides digital signals, I and Q indicating the amplitude of the in-phase and quadrature phase components of the signal AC1, AC2 at the antenna connections 202, 204. At step 530 the controller 220 reads stored values $I_{LAST}$, $Q_{LAST}$, from memory 240. At step 540 the controller performs a comparison of the I and Q values against the stored values $I_{LAST}$, $Q_{LAST}$. In the comparison performed at step 540 the absolute value of the difference between the stored and measured value of one signal component is calculated and compared to a threshold value to determine whether there has been a significant change in that component of the signal since the last detection cycle, e.g., to test whether $abs(I_{LAST}-I)$ is greater than a threshold value. A similar test is then applied, separately, to the other signal component, e.g., to test whether $abs(Q_{LAST}-Q)$ is greater than a threshold value.

At step 550 the result of the comparison performed at step 540 is determined. In the event that the measured I and Q values have not changed by more than the threshold, at step 580, controller 220 waits for an interval before the cycle is repeated starting from step 500. In the event that it is determined that the measured I and Q values have changed by more than the threshold, at step 570 the controller executes a polling sequence to determine the type of near-field RF communicator that has been detected and to initiate communication according to the required protocol.

In some examples, at step 580 a counter is incremented so that, after a number of cycles of the detection procedure described with reference to FIG. 2, the polling sequence can be performed. In some possibilities the polling sequence is performed at predetermined intervals regardless of whether the comparison indicates the presence of another near-field RF communicator present in near-field range. In other possibilities polling may be periodic or intermittent or may be performed in response to a specific user action such as, for example actuation of a user actuable switch or other input device.

Other procedures may be used at step 540 to compare the measured and stored signal values. For example, the sum of the squares of the differences between $I_{LAST}$ and I and $Q_{LAST}$ and Q (or the square root of this sum of squares) may be compared against a threshold value, e.g., to test whether $(I_{LAST}-I)^2+(Q_{LAST}-Q)^2$ is greater than a thresholdvalue. Alternatively, or in addition, the phase of the stored and measured signal may be compared, for example to test whether $Tan(I_{LAST}/Q_{LAST})-Tan(I/Q)$ is greater than some threshold phase difference. Of course these comparison processes are merely exemplary and other signal characteristics and other means of determining such changes in signal characteristics will be apparent to the skilled practitioner having read the present disclosure.

Antenna 200 comprises capacitance and inductance and so can be characterised by some complex impedance according to the phase and frequency response of the antenna 200 to a drive signal. In the example of FIG. 1, antenna 200 has been shown as a differential mode antenna but this is merely illustrative, examples of the invention provide single ended antenna configurations. Controller 200 may be provided by a suitably programmed general purpose processor, by a suitably configured collection of logic gates, or by a processor of a host device and/or by software or firmware downloaded onto an inbuilt processor of a suitably adapted near-field RF communicator.

As will be appreciated by the skilled practitioner in the context of the present disclosure, although FIG. 1 shows hardware adapted specifically for the purposes of the present invention in a near-field RF communicator comprising physical interface (PHY) coupled by a contactless front end (CLF) having some digital signal processing capability to a microprocessor, examples of the invention can be provided by suitable configuration of that microprocessor, for example using software or firmware provided that the microprocessor has access to the ADC of the contactless front end.

Any feature of the near-field RF communicators described herein may be used advantageously in combination with one or more features set out in one or more of the claims set out below. In addition particular features described as relating to a method extend to apparatus adapted to perform that method so that method features may be applied in apparatus aspects and apparatus features may be employed in method aspects of the invention.

CONCLUSION

It is to be appreciated that the Detailed Description section, and not the Abstract of the Disclosure, is intended to be used to interpret the claims. The Abstract of the Disclosure may set forth one or more, but not all, exemplary embodiments of the invention, and thus, is not intended to limit the invention and the subjoined claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined claims and their equivalents.

What is claimed is:

1. A method of operating a near-field radio frequency (RF) communicator, comprising:
   transmitting an RF signal;
   comparing at least one measure of in-phase and quadrature-phase components of a signal in an inductive coupler that is disposed in the near-field RF communicator with at least one stored value; and determining whether to initiate polling for another near-field RF communicator based on the comparison;
wherein transmitting, comparing and determining, together, require less time than polling for the other near-field RF communicator.

2. The method of claim 1, further comprising:
storing at least one value based on the at least one measure of the in-phase and quadrature-phase components in a memory to provide at least one stored value for a subsequent comparison.

3. The method of claim 2, wherein the at least one stored value comprises a first stored value indicating the in-phase component and a second stored value indicating the quadrature-phase component.

4. The method of claim 3, further comprising:
determining a first difference between the first indication and the first stored value; and
determining a second difference between the second indication and the second stored value.

5. The method of claim 4, further comprising:
comparing the first difference with a first threshold value;
comparing the second difference with a second threshold value; and
initiating the polling for the other near-field RF communicator in the event that the first difference exceeds the first threshold value or the second difference exceeds the second threshold value.

6. The method of claim 4, further comprising:
determining a square of the first difference and a square of the second difference to provide an indication of a magnitude of change from the stored value.

7. The method of claim 6, further comprising:
comparing the indication of the magnitude of change with a threshold value.

8. The method of claim 1, wherein the at least one measure of the in-phase and quadrature-phase components comprises a first indication of the in-phase component and a second indication of the quadrature-phase component.

9. The method of claim 8, further comprising:
determining a phase value based on the first and the second indications; and
comparing the phase value with a stored phase value.

10. The method of claim 1, further comprising:
initiating a polling procedure.

11. The method of claim 10, further comprising:
initiating the polling procedure at intervals regardless of whether the comparing and determining indicate the presence of the other near-field communicator in near-field range;
wherein the polling procedure is initiated periodically or intermittently.

12. A near-field radio frequency (RF) communicator, comprising:
an inductive coupler configured to inductively couple with a magnetic field (H-field);
a signal provider, coupled to the inductive coupler, configured to transmit a signal;
a signal characteristic determiner, coupled to the inductive coupler, configured to determine a signal characteristic, the signal characteristic indicative of a change in a complex impedance of the inductive coupler; and
a controller configured to perform a comparison between the signal characteristic and a stored value to indicate a presence of another near-field RF communicator and to initiate a polling procedure based on the comparison;
wherein the polling procedure requires more time than determining the signal characteristic and comparing the signal characteristic to the stored value.

13. The near-field RF communicator of claim 12, wherein the signal characteristic determiner is further configured to determine a first phase component of the signal and a second phase component of the signal, wherein the first phase component and the second phase component are not in phase.

14. The near-field RF communicator of claim 13, wherein the signal characteristic determiner comprises an IQ mixer.

15. A method of operating an electronic device, comprising:
determining, by a first near-field radio frequency (RF) communicator, whether a second near-field RF communicator is present within near-field range of the first near-field RF communicator; and
performing, by the first near-field RF communicator, when the second near-field RF communicator is present, a polling process to initiate communication with the second near-field RF communicator;
wherein the determining takes less time than the performing.

16. The method of claim 15, wherein the polling process comprises:
transmitting a wake-up signal to initiate communication with the second near-field RF communicator.

17. The method of claim 15, wherein the polling process comprises:
transmitting a plurality of wake-up signals in a sequence, each wake-up signal of the plurality of wake-up signals being adapted to initiate communication with a particular type of near-field RE communicator.

18. The method of claim 15, wherein the first near-field RF communicator includes an inductive coupler; and wherein determining comprises:
detecting in-phase and quadrature-phase components of a voltage in the inductive coupler; and
comparing at least one measure of the in-phase and quadrature-phase components of a signal in the inductive coupler with at least one stored value.

19. The method of claim 18, wherein determining further comprises:
storing at least one value based on the at least one measure of the in-phase and quadrature-phase components in a memory to provide the at least one stored value for subsequent comparison.

20. The method of claim 19, wherein determining further comprises:
comparing the in-phase and quadrature-phase components with a previously stored at least one measure; and
determining if the in-phase and quadrature-phase components of a newly received signal are different from the previously stored at least one measure by more than a predetermined threshold amount.

21. A method of operating a near-field radio frequency (RF) communicator, comprising:
transmitting a RF signal;
comparing at least one measure of in-phase and quadrature-phase components of a signal in an inductive coupler that is disposed in the near-field RF communicator with at least one stored value; and
determining whether to initiate polling for another near-field RF communicator based on the comparison;
wherein transmitting, comparing and determining, together, require less energy than polling for the other near-field RF communicator.

22. The method of claim 21, wherein transmitting, comparing, and determining, together, require less time than polling.

* * * * *